March 17, 1970     B. J. PARKER     3,501,367
HONEYCOMB CORE STRUCTURE
Filed Nov. 14, 1966
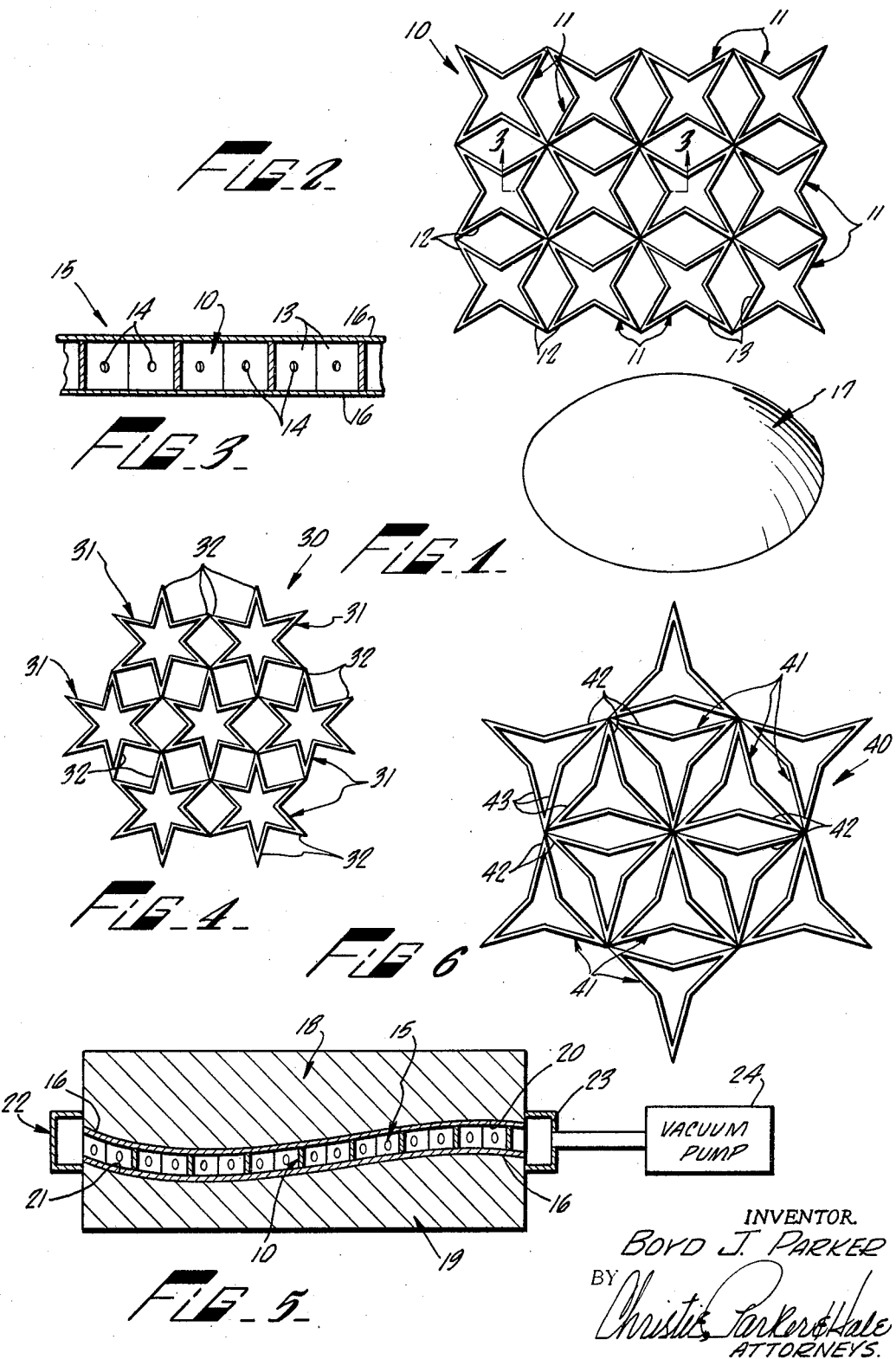
INVENTOR.
BOYD J. PARKER
BY 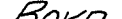
ATTORNEYS.

United States Patent Office 3,501,367
Patented Mar. 17, 1970

3,501,367
HONEYCOMB CORE STRUCTURE
Boyd J. Parker, 401 Manhattan Ave.,
Hermosa Beach, Calif. 90254
Filed Nov. 14, 1966, Ser. No. 593,991
Int. Cl. B32b 3/12
U.S. Cl. 161—68　　　　　　　　　　　　9 Claims

ABSTRACT OF THE DISCLOSURE

A honeycomb core structure having a plurality of interconnected cells having walls in a star-like arrangement is provided. Adjacent star-like cells are interconnected at their points so that between connected points the walls of the cell diverge to provide a structure having a plurality of alternate acute and obtuse angles in each cell wall. The honeycomb core therefore has bidirectional flexibility as compared with the unidirectional flexibility of a conventional honeycomb core.

---

This invention relates to a honeycomb core structure which is readily deformable into compound curvatures.

Conventional honeycomb core structures, such as are used in the fabrication of lightweight laminated structural members of the type shown in U. S. Patent No. 3,021,565, are configured to simuate natural honeycombs in that the cells of such structures have regular hexagonal cross-sectional configurations. Such core structures are difficult to form into curved shapes prior to lamination between two skin sheets, and such structures cannot be deformed to assume compound curvature without damage to the core structure. These characteristics of conventional honeycomb cores are attributable to the cell configuration of such cores. Because of such characteristics of conventional honeycomb cores, their use in dome-shaped structures and the like has been restricted.

This invention provides a novel honeycomb core structure which can be readily deformed to assume compound, even reverse compound, curvature. Such deformation is imposed on the core structure prior to and during the lamination of the core between a pair of facing skin sheets. The ability of the present core structure to assume compound curvature is not preferential to certain direction across the core.

Briefly stated, the present invention provides an improved honeycomb core structure. The structure is defined by a plurality of interconnected, substantially identical, hollow cylindrical cell units. Each cell unit has a cross-sectional configuration defining a regular star-like geometrical figure having $2n+2$ points, $n$ being ½ or an integer. The cell units are connected together so that two points of each unit are connected to two points of each adjacent unit.

As used herein to describe a cell unit in a honeycomb core, the terms "cylinder" or "cylindrical" are used in the mathematical sense, i.e., that surface defined in space by a line (generatrix) moving at all times parallel to a second line (directorix). In this regard, see definition "c" under "cylinder," Webster's New International Dictionary (unabridged), 2nd edition, 1946, G. & C. Merriam Company.

The above-mentioned and other features of the invention are more fully set forth in the following description of the invention which description is presented with reference to the accompanying drawings, wherein:

FIG. 1 is a perspective view of a spherically curved structure fabricated of honeycomb laminate according to this invention;

FIG. 2 is a top plan view of a portion of a honeycomb core structure according to the invention;

FIG. 3 is a cross-sectional elevation view taken along line 3—3 of FIG. 2;

FIG. 4 is a top plan view of another honeycomb core structure according to the invention;

FIG. 5 is a cross-sectional elevation view through a machine for forming a lanimate incorporating a core structure according to the invention; and FIG. 6 is a top plan view of a portion of another honeycomb core structure.

A portion of a honeycomb core structure 10 is shown in FIGS. 2 and 3. The core structure may extend as far as desired in all directions laterally of the structure shown in FIG. 2. The core structure is comprised of an indeterminate number of essentially identical, hollow cell units 11. The cell units are of cylindrical configuration and have lengths equal to the desired thickness of the core structure. When viewed end-on, as in FIG. 2, or in transverse cross-section, each cell unit defines a regular, i.e., equilateral, star-like geometrical figure; in the structure shown in FIG. 2, the figures each have 4 points 12. Each cell unit has walls 13 which are of substantially uniform thickness. There are twice the number of walls as there are points in each cell unit.

The cell units are connected together along their exterior edges at the points of the star-like figures. Each unit is connected at two adjacent points 12 to two adjacent points 12 of each adjacent cell unit; this is a characteristic of a core structure according to this invention.

To facilitate the evacuation of the core structure during the lamination of a structural element incorporating the core structure, each wall of each cell unit has a vent aperture 14 (FIG. 3) formed through it at about the center of area of the wall.

The core structure can be used advantageously in the manufacture of a lightweight, rigid, structural member 15 (FIG. 3) by laminating the core between a pair of face sheets 16 by techniques known to the art. If a structural element having compound curvature, such as dome 17 shown in FIG. 1, is desired, the core structure is deformed to the desired curvature before and during the lamination process. In this regard, FIG. 5 shows how such a complexly curved structural element may be made.

A pair of correspondingly contoured mold parts 18 and 19 are provided, the parts having mold surfaces 20 and 21, respectively. A face sheet 16 is laid against mold surface 21 and a suitable bonding agent is applied to its upper surface. A suitable quantity of core structure 10 is then laid over the lower face sheet and an upper face sheet 16, having a suitable bonding agent applied to its lower surface, is then laid over the core structure. Initial closure of the mold parts may then be effected to cause the face sheets and the core structure to deform to the contours of mold surfaces 20 and 21. If desired, an evacuating ring 22, arranged to fit snugly against the outer surfaces of the mold parts adjacent the mold surfaces, and defining an interior chamber 23 communicating with the core structure, may be disposed around the mold parts. The interior of the ring can be connected to a vacuum pump 24 for evacuating chamber 23 and the interior of the core structure to assure conformance of the laminate to the contour of the mold surfaces. Uniform evacuation of the core structure is assured by the presence of vent holes 14. Additional pressure upon the materials between the mold parts and heating of the mold parts may be relied upon to cure the bonding agent and cause the production of a secure bond between the core structure and the face sheets. The result is a lightweight, rigid structural element having the desired contours permanently set into it. Such a structural element can be used to advantage in the construction of aircraft and watercraft, especially yachts and hydrofoil vessels where strength with low weight is particularly desirable.

Core structure 10 deforms readily into spherical and other compound curves, as well as into reverse compound curvatures, because of the star-like cross-sectional configuration of cell units 11. Considering a cell unit from its axis, the alternate acute and obtuse angles between adjacent walls 13 permit the cell unit to deform easily in response to bending loads of the type imposed on the unit when the core structure is deformed out of its normal planar configuration. Assume that the core structure is to be given a spherical curvature. In bending into such curvature, the concave side of the structure is placed in compression while the convex side is placed in tension. Cell units 11 can deform laterally to accommodate such loads by closing partially in response to lateral compressive loads and expanding partially in response to lateral tensile loads. Conventional honeycomb core structures having hexagonally configured cell units cannot deform in this manner. As a result, core structure 10 is considerably more deformable than a conventional honeycomb core structure, yet, when laminated into structural element 15, it performs like a conventional honeycomb core.

A portion of another core structure 30 according to this invention is shown in FIG. 4. Structure 30 is comprised of a plurality of essentially identical, cylindrically configured, hollow cell units 31. Each cell unit, when viewed end-on, resembles regular 6-pointed stars having points 32. Each cell unit, at two of its points, is connected to two different points of each adjacent cell unit. The connection between cell units preferably extends along the junction between registered points of adjacent cell units. In structure 30, an inter-unit connection between adjacent cell units involves three cell units; in structure 10, such a connection involves one point from each of four adjacent cell units.

A portion of another core structure 40 is shown in FIG. 6. This core structure is composed of cell units 41 having cross-sectional configuration resembling three-pointed stars having points 42 and walls 43. Six cell units are involved in each connection between adjacent cell units. As with structures 10 and 30, the two wall surfaces of each cell unit 41 between adjacent points 42 intersect at a location midway between the points and inwardly of a line between the points.

For the purposes of a generic definition of the invention, a core structure according to the invention is defined by a plurality of cylindrical, hollow cell units, each of which is substantially identical to all others. Each cell unit has a cross-sectional configuration defining a star-like geometrical figure having $2n+2$ points, $n$ being either ½ or an integer. Thus, the cell units of a core structure according to this invention may have 3, 4, 6, 8, 10, . . . points. The greater the number of points in a cell unit, the better able is the unit to deform to accommodate lateral loads applied from any and all directions. The difficulty of fabrication of the core structure increases with increasing number of points in its cell unit. Core structures 10 and 30 are presently preferred embodiments of the invention, although structure 40 and other structures are also within the scope of the invention. Regardless of the number of points characterizing the cell units of a core structure, each cell unit has two adjacent points connected to two adjacent points of each adjacent cell unit.

Where $n$ is an odd integer, the array of cell unit in a core structure according to this invention defines columns and rows of cell units as shown in FIG. 2. Where $n$ is ½ or an even integer, the array of cell units defines a number of rows of cell units, the units in one row being staggered with respect to the units in the adjacent row.

A core structure according to this invention can be made of any material desired. For example, in accord with present practice in the manufacture of honeycomb cores for structural purposes, the core structure can be made of metal foil or sheet metal, or it can be made of deposited pulp material with or without resin coating or impregnation.

What is claimed is:
1. A honeycomb core structure comprising a plurality of interconnected, substantially identical, hollow cylindrical cell units each having a cross-sectional configuration defining a regular star-like geometrical figure having $2n+2$ points, $n$ being ½ or an integer, the cell units being connected together so that two points of each unit are connected to two points of each unit adjacent thereto.

2. A core structure according to claim 1 wherein each cell unit has twice the number of walls as points, there being two walls between adjacent points, said two walls intersecting midway between the two adjacent points and inwardly of the cell unit from a line between said points.

3. A core structure according to claim 2 wherein each cell unit defines a vent aperture through the walls thereof from the interior to the exterior of the unit.

4. A core structure according to claim 1 wherein two adjacent points of each cell unit are registered with and connected directly to two adjacent points of each adjacent cell unit.

5. A core structure according to claim 1 wherein each $n$ is an odd integer and the cell units are arranged in an array defining rows and columns of cell units.

6. A core structure according to claim 5 wherein each cell unit has four points.

7. A core structure according to claim 1 wherein $n$ is an even integer and the cell units are arranged in an array defining staggered rows of cell units.

8. A core structure according to claim 7 wherein each cell unit has six points.

9. A core structure according to claim 1 wherein each cell unit has three points.

References Cited

UNITED STATES PATENTS

| | | | |
|---|---|---|---|
| 1,528,310 | 3/1925 | Strzyczkowski | 161—69 X |
| 2,577,120 | 12/1951 | Franz | 211—71 |
| 3,018,205 | 1/1962 | Barut | 161—68 |
| 3,170,471 | 2/1965 | Schnitzer | 161—68 X |
| 3,227,600 | 1/1966 | Holland | 161—68 |
| 3,234,489 | 2/1966 | Hahne | 161—68 X |
| 3,425,885 | 2/1969 | Webb | 161—68 X |

JOHN T. GOOLKASIAN, Primary Examiner

J. C. GIL, Assistant Examiner

U.S. Cl. X.R.

52—615; 161—69